(No Model.) 2 Sheets—Sheet 2.
G. E. BARTHOLOMEW.
VEHICLE SEAT.
No. 349,135. Patented Sept. 14, 1886.
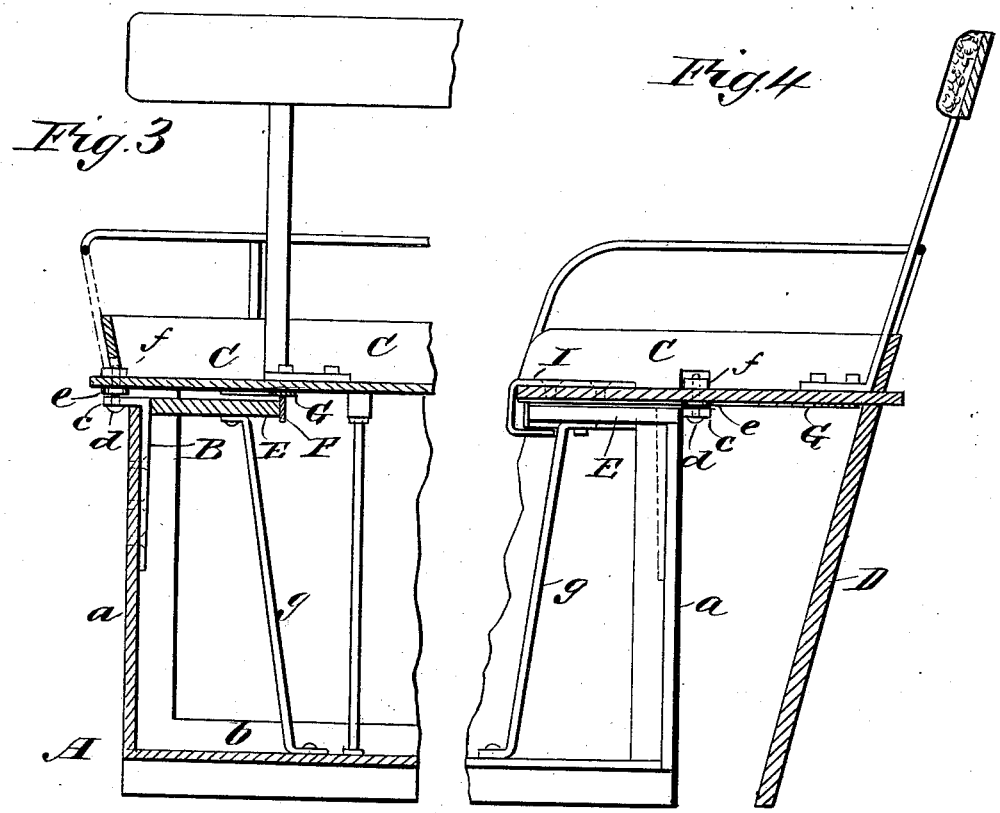
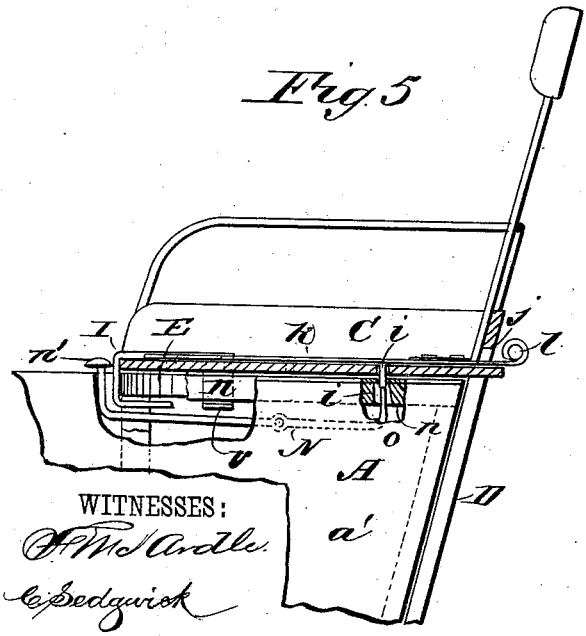
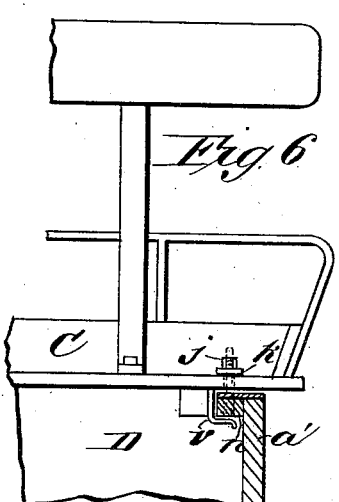
WITNESSES:
INVENTOR:
G. E. Bartholomew
BY Munn &Co.
ATTORNEYS.

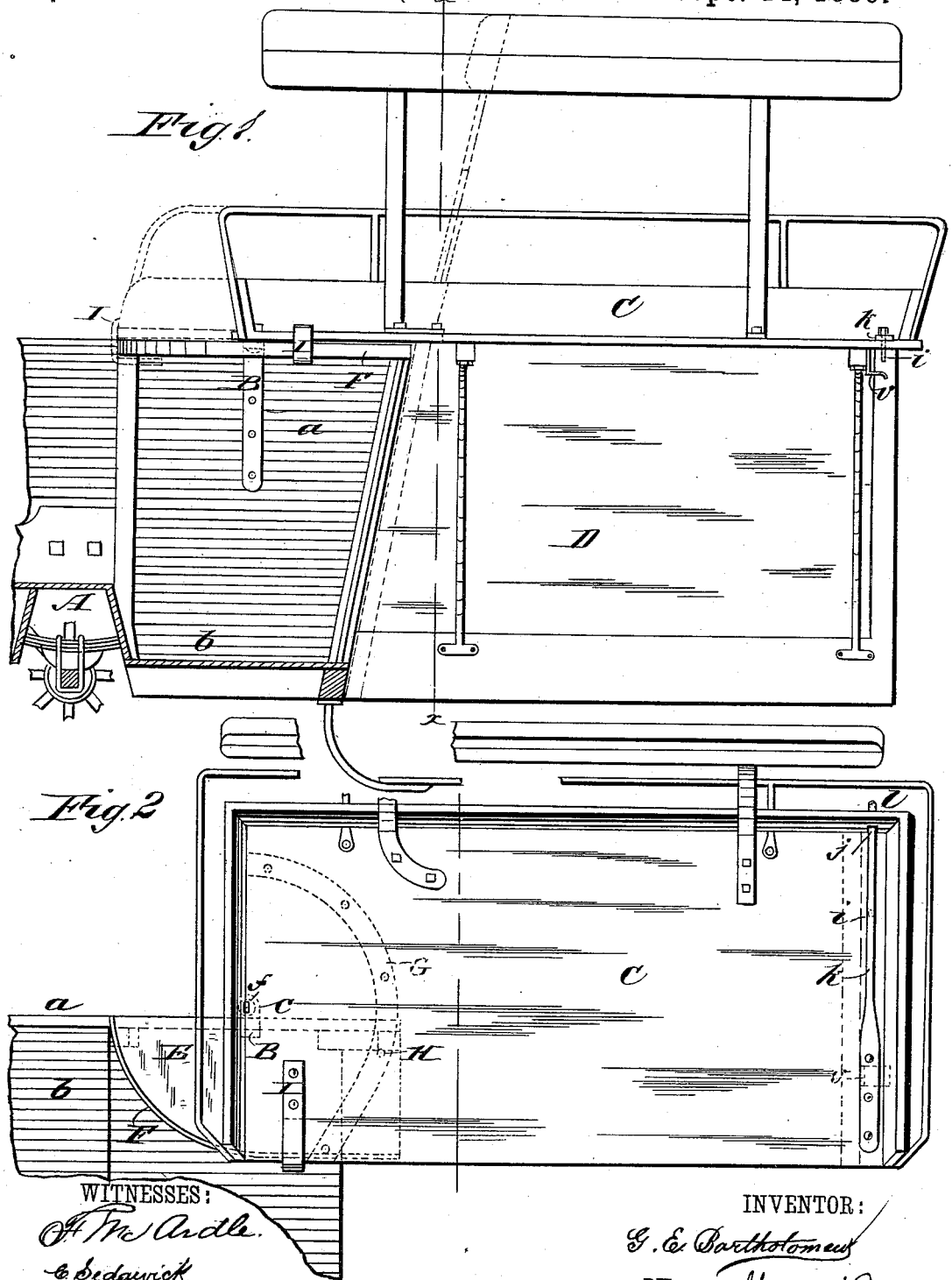

UNITED STATES PATENT OFFICE.

GEORGE E. BARTHOLOMEW, OF BROOKLYN, NEW YORK, ASSIGNOR TO HIMSELF AND EDMOND ARMANT, OF SAME PLACE.

VEHICLE-SEAT.

SPECIFICATION forming part of Letters Patent No. 349,135, dated September 14, 1886.

Application filed December 26, 1885. Serial No. 186,753. (No model.)

*To all whom it may concern:*

Be it known that I, GEORGE EUGENE BARTHOLOMEW, of Brooklyn, in the county of Kings and State of New York, have invented a new and Improved Vehicle-Seat, of which the following is a full, clear, and exact description.

This invention relates to the construction of that class of vehicles wherein it is desirable that the back seat should be free to swing outward in order to form an opening in the box, through which the passengers may enter or leave the vehicle; and the invention consists of a peculiar and novel construction, whereby the seat is firmly held and prevented from sagging when in its open or extended position.

Reference is to be had to the accompanying drawings, forming a part of this specification, in which similar letters of reference indicate corresponding parts in all the figures.

Figure 1 is a longitudinal sectional view of a portion of a vehicle-body provided with my improved form of swinging seat, said seat being shown in the position it assumes when thrown back to the position to open the wagon. Fig. 2 is a plan view of a portion of the vehicle body and seat when in the position shown in Fig. 1. Fig. 3 is a vertical cross-sectional view of a portion of the body and seat, the seat being in its normal or closed position. Fig. 4 is a view of a portion of the rear end of the vehicle-body, the seat being shown in section and in its open position, said view being taken on line $x\ x$ of Fig. 1. Fig. 5 is a side view of the rear end of the vehicle-body, the seat being shown in closed position and partial section, while certain portions of the vehicle-body are cut away to disclose the construction of the parts; and Fig. 6 is a view of a portion of the seat and vehicle-body, the said vehicle-body being shown in section.

Prior to my invention many attempts have been made to so construct a vehicle that its rear seat could be moved to a position to open a way to the body of the vehicle; but all such attempts have failed by reason of the improper connection and mounting of the seat. With my improved construction, however, I am able to produce a vehicle wherein the rear seat may be swung to an open position, and be there supported in practically rigid position in so far as any vertical sagging or motion is concerned.

This improved construction is fully illustrated in the drawings above referred to, wherein A represents the body of a vehicle, $a\ a'$ being the side walls and $b$ the flooring of said vehicle-body. A heavy angle-iron, B, is rigidly secured to the side wall, $a$, in position, so that the upper and short arm, $c$, projects outwardly across the top of the said side wall. In this projecting arm $c$ of the bracket or angle iron B there is formed an aperture or socket, through which there is passed a bolt, $d$, that extends upward through one end of the bottom of the seat C, a wear-plate, $e$, being fixed to the under side of the seat, in position so as to come just over the arms $c$, the parts being held in place by a nut, $f$, this construction being best shown in Figs. 3 and 4.

The seat C is formed with a downwardly-extending tail board or panel, D, arranged to fit closely against the rear end of the vehicle-body, as shown in Fig. 5.

Beneath the seat C, I arrange a heavy supporting-bracket, E, which is fixed to the body-frame of the vehicle and firmly braced by rods $g$, as shown in Figs. 1 and 3. The forward edge of this bracket E is formed on the arc of a circle of which the bolt $d$ is the center, and the entire edge of the bracket is surrounded by a curb, F, which is firmly fixed to said edge. Upon the bottom of the seat there is a circular wear-plate, G, arranged to bear upon the upper edge of the curb F, and also upon the wear-plate H, that is fixed to the upper face of the rear and outer corner of the bracket E. Upon the upper face of the seat C there is firmly secured a clamp-hook, I, which extends downward in front of, and then backward beneath, the curb F of the bracket E, bearing close against the under edge of said curb. From this construction it will be seen that the seat C may be swung upon its pivotal connection from its normal position (shown in Fig. 5) to the position shown in Figs. 1, 2, and 4, and it will also be seen that when the seat is so swung to the open position it will be held in practically rigid connection with the wagon as regards sagging or vertical play, being at this time held by the clamp I, and the greater portion of the weight being borne by the plate H and curb F.

When the seat is closed, any backward tilting movement is prevented by the engagement of the hook I with the curb F, and the engagement of a hook, e, with a plate, n, of the side a', as will be seen from an inspection of Figs. 5 and 6. When so closed in the seat is held from swinging backward by a pin, i, that is carried by a spring-strip, k, fixed to the inner side of the upper face of the seat, and extending outward beyond the back of the seat through a slot, j, formed for its accommodation and terminating in a manipulating knob or ring. l. This pin i passes down through the bottom of the seat and into an aperture formed for its reception in the plate n of the vehicle-frame, so that any swinging movement of the seat is prevented, and it may still be readily freed from connection with the side a' by simply raising the knob l, and thereby withdrawing the pin i from engagement with the socket formed in the plate n. It will be seen that this catch as described is manipulated from the rear of the seat; but in order that the pin i may be forced from engagement with the socket in the plate n, I pivot a lever, N, to the side wall, a', so that the manipulating-knob n' extends forward to the front of the seat, while at the rear of the lever there is an upwardly-extending arm, o, which enters the socket in the plate n and forces the pin i from engagement therewith.

Having thus fully described my invention, what I claim as new, and desire to secure by Letters Patent, is—

1. The combination, with a vehicle-body provided with an angle-iron or bracket, B, and a bracket provided with a curb, F, of a seat pivotally connected to the arm c of the iron B, and provided with a hook, I, and a wear-plate, G, substantially as described.

2. The combination, with a vehicle-body provided with a bracket, B, formed with an arm, c, of a seat, C, pivotally connected to said arm c, and provided with a wear-plate, G, and a hook, I, which are respectively arranged above and below a curb, F, carried by a bracket, E, said bracket being provided with a wear-plate, H, substantially as described.

3. The combination, with a vehicle-body, of a seat pivotally connected thereto and provided with a spring-strip, k, carrying a pin, i, arranged to engage with a socket formed in the plate n, substantially as described.

4. The combination, with a vehicle-body, of a seat pivotally connected thereto and provided with a spring, k, carrying a pin, i, arranged to engage with a socket formed in the plate n, and a lever, N, pivoted to the wagon-body and provided with an arm, o, substantially as described.

GEORGE E. BARTHOLOMEW.

Witnesses:
EDWARD KENT, Jr.,
C. SEDGWICK.